United States Patent
D'Agostino et al.

(10) Patent No.: US 12,441,872 B2
(45) Date of Patent: Oct. 14, 2025

(54) ROTOMOLDING COMPOSITION

(71) Applicant: Nova Chemicals (International) S.A., Fribourg (CH)

(72) Inventors: Carmine D'Agostino, Mississauga (CA); Gilbert Arnould, Calgary (CA); Celine Bellehumeur, Calgary (CA); Henry Hay, Calgary (CA); Van Dang, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 544 days.

(21) Appl. No.: 17/799,117

(22) PCT Filed: Feb. 10, 2021

(86) PCT No.: PCT/IB2021/051084
§ 371 (c)(1),
(2) Date: Aug. 11, 2022

(87) PCT Pub. No.: WO2021/165790
PCT Pub. Date: Aug. 26, 2021

(65) Prior Publication Data
US 2023/0124453 A1   Apr. 20, 2023

Related U.S. Application Data

(60) Provisional application No. 62/977,549, filed on Feb. 17, 2020.

(51) Int. Cl.
*C08L 23/0807* (2025.01)
*C08K 5/00* (2006.01)

(52) U.S. Cl.
CPC .......... *C08L 23/0815* (2013.01); *C08K 5/005* (2013.01); *C08L 2201/08* (2013.01); *C08L 2205/025* (2013.01)

(58) Field of Classification Search
CPC ... B29C 41/003; B29C 41/06; B29K 2023/06; C08K 3/014; C08K 5/005; C08L 2201/08; C08L 2205/025; C08L 23/0815
See application file for complete search history.

(56) References Cited

U.S. PATENT DOCUMENTS

| | | | |
|---|---|---|---|
| 4,440,899 A * | 4/1984 | Peerlkamp | C09D 123/06 525/240 |
| 4,533,696 A | 8/1985 | Schrijver et al. | |
| 5,844,029 A | 12/1998 | Prabhu et al. | |
| 2001/0025092 A1 | 9/2001 | Kallio et al. | |
| 2010/0187726 A1 | 7/2010 | Gibbons et al. | |

FOREIGN PATENT DOCUMENTS

WO   WO-2017/160243 A1   9/2017

OTHER PUBLICATIONS

ASTM D 1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).
ASTM D1921-18—Standard Test Methods for Particle Size (Sieve Analysis) of Plastic Materials—Copyright ASTM International—Current edition approved Apr. 1, 2018. Published Apr. 2018. Originally approved in 1961. Last previous edition approved in 2012 as D1921-12 (pp. 1-4).
ASTM D792-13 Standard Test Methods for Density and Specific Gravity (Relative Density) of Plastics by Displacement—Copyright ASTM International—Current edition approved Nov. 1, 2013. Published Nov. 2013. Originally approved in 1944. Last previous edition approved in 2008 as D792-08 (pp. 1-6).
International Search Report & Written Opinion of the International Searching Authority issued in PCT Application No. PCT/IB2021/051084, mailed May 25, 2021.

* cited by examiner

*Primary Examiner* — Ana L. Woodward
(74) *Attorney, Agent, or Firm* — Thomas J. Styslinger

(57) ABSTRACT

A rotomolding composition comprises a blend of two polyethylenes: 1) a well stabilized polyethylene; and 2) a poorly stabilized polyethylene having a very low flow rate. The poorly stabilized polyethylene is further characterized by having a large particle size (from 500 to 3000 microns). Rotomolded parts prepared from the composition have a rough inner surface. Polyurethane foam adheres well to this rough surface.

9 Claims, No Drawings

ROTOMOLDING COMPOSITION

CROSS-REFERENCE TO RELATED APPLICATIONS

This application is a U.S. National Phase Application under 35 U.S.C. § 371 of International Application No. PCT/IB2021/051084, filed Feb. 10, 2021, which claims priority to and the benefit of U.S. Provisional Application No. 62/977,549, filed Feb. 17, 2020, both of which are hereby incorporated by reference in their entireties.

TECHNICAL FIELD

Compositions and processes for rotomolding that provide rotomolded parts having improved ability to adhere to polar polymers.

BACKGROUND ART

Rotational molding, also known as rotomolding, is a well known process which is widely used to produce hollow plastic parts such as gasoline containers, garbage cans, agricultural storage vessels, septic tanks and sporting goods such as kayaks. The process is undertaken by loading a charge of finely divided plastic resin into the mold "shell", then rotating the mold (usually, on two axes) while heating it to a temperature above the melting point of the plastic resin. The melted plastic flows through the mold cavity under the forces caused by the rotation of the apparatus. The rotation continues for sufficient time to allow the molten plastic to cover the surface of the mold. The mold is then cooled to permit the plastic to freeze into a solid. The final stage of the molding cycle is the removal of the part from the rotomolding machine.

It will be recognized that the rotomolding process produces a hollow part—that is, a part with an interior surface and an exterior surface. For some end uses, it is desirable to coat the interior surface—or even fill the hollow area—so as to provide a layer of insulation or improve structural strength or buoyancy. In particular, it is known to use polyurethane for this coating or filling. However, it is difficult to effectively attach the polyurethane to polyethylene because of the differences in the polarity of these two polymers. The problem can be resolved by treating the polyethylene to increase surface polarity but this is expensive.

SUMMARY OF INVENTION

In some embodiments, disclosed herein are compositions and processes that provide a rotomolded part with an interior surface having a high surface roughness. In these embodiments, improved adhesion to polyurethane is observed.

In one embodiment, there is provided a polyethylene composition including:
1) from 85 to 99 weight % of a stabilized polyethylene having a melt index, $I_2$, as measured by ASTM D 1238 at 190° C. using a 2.16 kg lead, of from 0.5 to 10 grams/10 minutes; a density as measured by ASTM D792 of from 0.920 to 0.950 g/cc; and
2) from 15 to 1 weight % of a substantially non-stabilized polyethylene having (i) a high load melt index, $I_{21}$, as measured by ASTM D1238 at 190° C. using a 21.6 kg load, of from 2 to 20 grams/10 minutes; (ii) a density of from 0.950 to 0.965 g/cc as measured by ASTM D792; and (iii) an average particle size of from 500 to 3000 microns.

Definition of Terms

Other than in the examples or where otherwise indicated, all numbers or expressions referring to quantities of ingredients, extrusion conditions, etc., used in the specification and claims are to be understood as modified in all instances by the term "about". Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "α-olefin" is used to describe a monomer having a linear hydrocarbon chain containing from 3 to 20 carbon atoms having a double bond at one end of the chain; examples include butene-1; hexene-1 and octene-1.

DESCRIPTION OF EMBODIMENTS

A. Polyethylene

Polyethylene is a commonly used plastic resin for the manufacture of rotomolded parts. Polyethylene copolymer (which is generally prepared by the copolymerization of ethylene with a $C_{4\,to\,10}$ alpha olefin in the presence of a chromium catalyst or a Ziegler Natta catalyst) is typically used, although it is also known to use polyethylene homopolymer. The alpha olefin comonomer produces "short chain branches" (SCB) in the copolymer. These SCB reduce the crystallinity of the copolymer (in comparison to a linear ethylene homopolymer) and the copolymers typically have improved impact resistance in comparison to homopolymers. These conventional polyethylenes may be referred to as "heterogeneous" in the sense that the polyethylene is actually a mixture of different polyethylene chains having significantly different molecular weights and comonomer distributions. Most notably, a conventional heterogeneous polyethylene generally contains three fractions:

i) a low molecular weight fraction having a high comonomer content (or high level of SCB)—this fraction is often referred to as "wax" or "extractables";

ii) a very high molecular weight fraction having little or no comonomer—this fraction is often referred to as "homopolymer"; and iii) a fraction of intermediate molecular weight and SCB content.

These conventional polyethylenes are well suited for rotomolding. For example, whilst not wishing to be bound by theory, it has been postulated that the high molecular weight "homopolymer" fraction may enhance the stiffness or modulus of the rotomolded parts.

More recently, homogeneous polyethylenes have become commercially available. These homogenous polyethylenes have a uniform (or narrow) molecular weight distribution and a uniform comonomer distribution. This, in turn, causes the homogeneous polyethylenes to have a well-defined melting point (in comparison to the heterogeneous polyethylenes which have a melting point "range", or even multiple melting points). It is also known to use "homogeneous" polyethylene in a rotomolding process.

Stabilized Polyethylene

The term "stabilized polyethylene" broadly refers to a polyethylene (which may be a heterogeneous polyethylene or a homogeneous polyethylene) that contains a "stabilizer" package to protect the polyethylene against degradation/oxidation during the rotomolding process. In general, any stabilizer package that is currently used in a rotomolding application is potentially suitable for use in the present process. Skilled persons will recognize that many such stabilizer packages are in current use.

In an embodiment, the stabilizer package includes:

1) a primary antioxidant (which, while not wishing to be bound by theory, is commonly believed to scavenge free radicals);

2) a secondary antioxidant (which, while not wishing to be bound by theory, is commonly believed to quench hydroperoxides).

Suitable (non-limiting) examples of primary antioxidants include hindered phenols; hydroxylamines and lactones, and suitable amounts are from 100 to 2000 (especially from 250 to 1500) parts per million by weight ("ppm") based on the weight of the polyethylene.

Suitable (non-limiting) secondary antioxidants include phosphites and phosphinites, particularly in amounts of from 100 to 2000 (especially 250 to 1500 ppm).

It is also desirable to include a Hindered Amine Light Stabilizer (HALS) in rotomolding compositions, particularly in amounts of from 500-3000 ppm. The optional additional use of zinc oxide (in an amount of from 500 to 5000 parts per million by weight) and or an ultraviolet (UV) absorber may further improve the stability of a rotomolded part that is exposed to sunlight.

In an embodiment, the stabilizer package includes:

1) from 250 to 1500 ppm of at least one primary antioxidant chosen from:
   1.1) hindered phenols; and
   1.2) hydroxylamines; and 2) from 100 to 1000 ppm of at least one secondary antioxidant chosen from:
   2.1) phosphites; and
   2.2) phosphinites; and 3) from 500 to 3000 ppm of HALS; and 4) from 0 to 5000 ppm of zinc oxide.

Many other additives are also known to be used with polyethylene. Some of these additives are described in the Additives section, below.

The additives may be incorporated into the polyethylene compositions using mixing equipment such as an extruder, or internal batch mixer (also known as a banbury mixer). The additive may be added "neat" (i.e. directly to the resin); as a "masterbatch" (i.e. by premixing the additives with a small amount of polyethylene which is subsequently mixed with the bulk of the composition); or as "preblends" (i.e., mixtures of the additives).

The stabilized high density polyethylene composition is, in some, embodiments, ground to powder before being used in the rotomolding process (which is a conventional practice in rotomolding). Suitable (non-limiting) average particle sizes for the powder are from 200 to 400 microns. In an embodiment, the average particle size of the stabilized polyethylene is lower/smaller than the average particle size of the substantially non-stabilized polyethylene.

Additives

In an embodiment, the rotomolding composition may contain:

A) at least one primary antioxidant chosen from
   A.1) a hindered phenol (non limiting examples of which are described in sections 1.1 and 1.4, below); and
   A.2) a hydroxylamine (non limiting examples of which are described in section 5, below);

B) at least one secondary antioxidant chosen from phosphites and phosphonites (non limiting examples of which are described in section 4, below); and C) at least one hindered amine light stabilizer "HALS" (non limiting examples of which are described in section 2.6, below).

Many other additives may also be included in polyethylene compositions used in a rotomolding process. Some of these additives are briefly described below.

1. Antioxidants (Also Referred to as "Hindered Phenols")

1.1 Alkylated Mono-Phenols

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6,-tricyclohexyphenol; 2,6-di-tert-butyl-4-methoxymethylphenol; and Vitamin E.

1.2 Alkylated Hydroquinones

For example, 2,6di-tert-butyl-4-methoxyphenol; 2,5-di-tert-butylhydroquinone; 2,5-di-tert-amyl-hydroquinone; and 2,6diphenyl-4-octadecyloxyphenol.

1.3 Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

1.4 Alkylidene-Bisphenols (Also Referred to as "Hindered Phenols")

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl)

phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonylphenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5-tert-butyl-4-hydroxy2-methylphenyl)-3-dodecyl-mercaptobutane; ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene; di-(2-(3'-tert-butyl-2'hydroxy-5'methylbenzyl)-6-tert-butyl-4-methylphenyl) terephthalate; and other phenolics such as monoacrylate esters of bisphenols such as ethylidiene bis-2,4-di-t-butylphenol monoacrylate ester.

2. UV Absorbers and Light Stabilizers 2.1 2-(2'-hydroxyphenyl)-benzotriazoles

For example, the 5'-methyl-,3'5'-di-tert-butyl-,5'-tert-butyl-,5'(1,1,3,3-tetramethylbutyl)-,5-chloro-3',5'-di-tert-butyl-,5-chloro-3'-tert-butyl-5'-methyl-3'-sec-but yl-5'-tert-butyl-,4'-octoxy,3',5'-ditert-amyl-3',5'-bis-(alpha, alpha-di methylbenzyl)-derivatives.

2.2 2-Hydroxy-Benzophenones

For example, the 4-hydroxy-4-methoxy-,4-octoxy,4-decyloxy-, 4-dodecyloxy-,4-benzyloxy,4,2',4'-trihydroxy- and 2'-hydroxy-4,4'-dimethoxy derivative.

2.3 Hindered Amine Light Stabilizers (HALS)

For example, bis (2,2,6,6-tetramethylpiperidyl)-sebacate; bis-5 (1,2,2,6,6-pentamethylpiperidyl)-sebacate; n-butyl-3,5-di-tert-butyl-4-hydroxybenzyl malonic acid bis(1,2,2,6,6,-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone). These amines typically called HALS (Hindered Amines Light Stabilizing) include butane tetracarboxylic acid 2,2,6,6-tetramethyl piperidinol esters. Such amines include hydroxylamines derived from hindered amines, such as di(1-hydroxy-2,2,6,6-tetramethylpiperidin-4-yl) sebacate; 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperdine; and N-(1-hydroxy-2,2,6,6-tetramethyl-piperidin-4-yl)-epsiloncaprolactam.

3. Phosphites and Phosphonites

For example, triphenyl phosphite; diphenylalkyl phosphates; phenyldialkyl phosphates; tris(nonyl-phenyl)phosphite; trilauryl phosphite; trioctadecyl phosphite; distearyl pentaerythritol diphosphite; tris(2,4-di-tert-butylphenyl) phosphite; diisodecyl pentaerythritol diphosphite; 2,4,6-tri-tert-butylphenyl-2-butyl-2-ethyl-1,3-propanediol phosphite; bis(2,4-di-tert-butylphenyl)pentaerythritol diphosphite tristearyl sorbitol triphosphite; and tetrakis(2,4-di-tert-butylphenyl)4,4'-biphenylene diphosphonite.

4. Peroxide Scavengers

For example, esters of betathiodipropionic acid, for example the lauryl, stearyl, myristyl or tridecyl esters; mercaptobenzimidazole or the zinc salt of 2-mercaptobenzimidazole; zinc-dibutyldithiocarbamate; dioctadecyldisulfide; and pentaerythritottetrakis-(beta-dodecylmercapto)-propionate.

5. Hydroxylamines and Amine Oxides

For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamnine; N-heptadecyl-N-octadecylhydroxylamine; and N,N-dialkylhydroxylamine derived from hydrogenated tallow amine. The analogous amine oxides (as disclosed in U.S. Pat. No. 5,844,029, Prachu et al.) are also suitable.

6. Nitrones

For example, N-benzyl-alpha-phenyl nitrone; N-ethyl-alpha-methyl nitrone; N-octyl-alpha-heptyl nitrone; N-lauryl-alpha-undecyl nitrone; N-tetradecyl-alpha-tridecyl nitrone; N-hexadecyl-alpha-pentadecyl nitrone; N-octadecyl-alpha-heptadecylnitrone; N-hexadecyl-alpha-heptadecyl nitrone; N-octadecyl-alpha-pentadecyl nitrone; N-heptadecyl-alpha-heptadecyl nitrone; N-octadecyl-alpha-hexadecyl nitrone; and nitrone derived from N,N-dialkylhydroxylamine derived from hydrogenated tallow amine.

7. Basic Co-Stabilizers

For example, melamine; polyvinylpyrrolidone; dicyandiamide; triallyl cyanurate; urea derivatives; hydrazine derivatives; amines; polyamides; polyurethanes; alkali metal salts and alkaline earth metal salts of higher fatty acids, for example, Ca stearate, calcium stearoyl lactate, calcium lactate, Zn stearate, Mg stearate, Na ricinoleate and K palmitate; antimony pyrocatecholate or zinc pyrocatecholate, including neutralizers such as hydrotalcites and synthetic hydrotalcites; and Li, Na, Mg, Ca, Al hydroxy carbonates.

8. Nucleating Agents

For example, 4-tert-butylbenzoic acid; adipic acid; diphenylacetic acid; sodium salt of methylene bis-2,4-dibutylphenyl; cyclic phosphate esters; sorbitol tris-benzaldehyde acetal; and sodium salt of bis(2,4-di-t-butylphenyl) phosphate or Na salt of ethylidene bis(2,4-di-t-butyl phenyl) phosphate. Nucleating agents may improve stiffness of the rotomolded part.

9. Fillers and Reinforcing Agents

For example, calcium carbonate; silicates; glass fibers; asbestos; talc; kaolin; mica; barium sulfate; metal oxides and hydroxides; carbon black and graphite.

10. Miscellaneous

For example, plasticizers; epoxidized vegetable oils, such as epoxidized soybean oils; lubricants; emulsifiers; pigments; optical brighteners; flameproofing agents; anti-static agents; blowing agents and thiosynergists, such as dilaurythiodipropionate or distearylthiodipropionate.

Substantially Non-Stabilized Polyethylene

The term "substantially non-stabilized" means that the polyethylene is susceptible to oxidation during the rotomolding process. This can be confirmed after the rotomolding process by observing the formation of oxidized species (especially carbonyl groups) on the interior surface of the rotomolded part. The oxidized species may be detected using a conventional Fourier Transform Infra Red ("FTIR") instrument.

As a general guideline, the substantially non-stabilized polyethylene should contain less than 100 ppm of primary antioxidant and/or secondary antioxidant and may contain no primary or secondary antioxidant. In an embodiment, the substantially non-stabilized polyethylene does not contain any primary or secondary antioxidant.

In some embodiments, the substantially non-stabilized polyethylene has a very low flow rate. Flow rate is determined by measuring the amount of polymer that will flow through a capillary at a specified temperature and load. ASTM D1238 is used to measure the flow rate. In an embodiment, the non-stabilized polyethylene does not have a meaningful/measurable flow rate when using a 2.16 kg load in ASTM D1238 (at 190° C.). The "high load" flow rate using the 21.6 kg load is from 2 to 20 grams/10 minutes, or for example, from 3 to 6 grams/10 minutes. Flow rate is also commonly referred to as "melt index."

In an embodiment, the substantially non-stabilized polyethylene is prepared using a heterogeneous catalyst such as a Zeigler Natta Catalyst or a chromium catalyst.

Interior Surface of Molded Part

While not wishing to be bound by theory, it is believed that rotomolded parts that are prepared by this process have an exterior surface which is predominantly made from the stabilized polyethylene (described above) and that the substantially non-stabilized polyethylene tends to be located away from the exterior surface (especially at the interior surface).

In an embodiment, the interior surface of the part has a higher surface roughness than the exterior surface. Surface roughness may be measured with a mechanical or optical profilimeter. We have measured the roughness of the interior surface of parts made by the present process using a laser confocal microscope (a type of optical profilimeter) and observed a mean surface roughness, "Ra", of greater than 10 microns. In comparison, the exterior surface has been observed to have a much lower surface roughness—for example, an Ra of from 2 to 4 microns).

In addition, we have observed the presence of carbonyl groups on the interior surface and, while not wishing to be bound by theory, we believe that these carbonyl groups are formed by the oxidation of the substantially non-stabilized polyethylene.

We have conducted adhesion tests (described in the examples) to measure the strength of the bond between the surface of rotomolded parts in a polyurethane layer. These tests show that high strength bonds are formed when the surface of the rotomolded part has both of a) high surface roughness; and b) carbonyl groups.

B. Rotomolding Process

As previously noted, rotational molding is a well known process which is undertaken by loading a charge of finely divided plastic resin into the mold "shell", then rotating the mold (usually, on two axes) while heating it to a temperature above the melting point of the plastic resin. The melted plastic flows through the mold cavity under the forces caused by the rotation of the apparatus. The rotation continues for sufficient time to allow the molten plastic to cover the surface of the mold. The mold is then cooled to permit the plastic to freeze into a solid. The final stage of the molding cycle is the removal of the part from the rotomolding machine.

The time required to complete the molding cycle is a function of the bulk properties of the plastic which is being molded; the size of the part being molded and the molding temperature. In addition, the plastic resin which is charged into the mold is preferably finely divided (i.e. ground into powder) and has a high bulk density and a narrow particle size distribution to facilitate the "free flow" of the resin.

It will also be appreciated that the physical properties of the rotomolded part are influenced by the use of a proper molding cycle time with "undercooked" parts having poor strength properties and "overcooked" parts suffering from poor appearance (a "burnt" color) and/or a deterioration of strength properties. It is desirable to have a short molding cycle (so as to improve the productivity of the expensive rotomolding machinery) and a broad "processing window" (i.e. the rotomolding composition ideally provides "properly cooked" parts in a short period of time but does not become "overcooked" for an extended period of time).

In addition, the properties of the rotomolded part are affected by the molecular structure of the polymer used to prepare the part. Physical properties of importance include stiffness (as indicated by the modulus of the part), environmental stress crack resistance (or "ESCR"), impact resistance and resistance to warpage.

Thus, the molding time and temperature of the process are affected by many variables. Specific/preferred conditions can also be impacted by the choice of machine. However, those skilled in the art will be able to optimize conditions without undue difficulty. Suitable conditions for rotomolding the present composition are illustrated in the examples.

Example 1

Polyethylene

The polyethylene used in the Examples are shown in Table 1.

PE-1 is SURPASS® RMs539-UG, NOVA Chemicals.
PE-2 is NOVAPOL® TR-0735-UG, NOVA Chemicals.
PE-4 is SCLAIR® 19A, NOVA Chemicals.

PE-1 and PE-2 are each examples of a "stabilized polyethylene" that are suitable for use in the present compositions and process. PE-1 and PE-2 are also suitable for use in a conventional rotomolding process.

PE-3 is a substantially non-stabilized polyethylene—as shown in Table 1 it does not contain antioxidant. In addition, the flow rate of PE-3 is very low: it does not have a meaningful $I_2$ (i.e. it does not demonstrate a meaningful flow rate as measured by ASTM D1238 at 190° C. using a 2.16 kg load) and has a "high load melt index, $I_{21}$", (as measured by ASTM D1238 at 190° C. using a 21.6 kg load) of only 4.5 grams per 10 minutes. Also, the average particle size of PE-3 is large (700 microns).

PE-4 is included for comparison purposes. It has a high load melt index, $I_{21}$, of 64 grams per 10 minutes. Thus, PE-4 "flows" more easily than PE-3 as the $I_{21}$ of PE-4 is much higher than the $I_{21}$ of PE-3. However, the $I_2$ of PE-4 is less than 1 gram per 10 minutes (as shown in Table 1). The I2 flow rate of polyethylene used in a conventional rotomolding process is normally higher than this. In summary: PE-4 has a flow rate that is lower than that of the polyethylene that is used in a conventional rotomolding process—but—the flow rate is "too high" to be used as the substantially non-stabilized polyethylene of the present compositions. PE-4 has an average particle size of 600 microns.

Average particle size is measured by ASTM D1921.

A series of blends were made with these polyethylenes. The blend compositions are shown in Table 2.

TABLE 1

| Polyethylene | I$_2$ g/10 min | I$_{21}$ g/10 min | Density g/cc | Melting Point (° C.) | Average Particle Size (microns) | Comonomer |
|---|---|---|---|---|---|---|
| PE-1 | 5.2 | | 0.939 | 125 | 280 | Octene |
| PE-2 | 7.0 | | 0.935 | 126 | 280 | Hexene |
| PE-3 | — | 4.5 | 0.955 | 132 | 700 | Hexene |
| PE-4 | <1 | 64 | 0.961 | 132 | 600 | Butene |

Both of PE-1 and PE-2 are suitable for use in conventional/typical rotomolding processes and are suitable as the "stabilized polyethylene" of the present technology. PE-1 is prepared with a single site catalyst; PE-2 is prepared with a conventional Zeigler Natta catalyst.

The stabilizer additives that were added to the PE-1 used in these examples are reported below, expressed as parts per million by weight, based on the weight of the polyethylene ("ppm"). Tradenames of the stabilizers are provided for convenience, together with a description of the chemical name or Chemical Abstracts Registry Number.

1. 250 ppm of IRGASTAB™ FS042 (n,n,-di(alkyl) hydroxylamine)
2. 450 ppm of DOVERPHOS™ 9228 (a diphosphite: CAS Registry number 154862-43-8)
3. 750 ppm of TINUVIN™ 622 (HALS: CAS Registry number 65447-77-0)
4. 750 ppm of CHIMASSORB™ 944 (HALS: CAS Registry number 70624-18-9)
5. 750 ppm of zinc oxide The stabilizer package added to PE-2 is similarly described below:

1. 500 ppm of IRGANOX™ 1076 (hindered phenol: octadecyl 3-(3,5 di-tert-butyl-4-hydroxylphenyl) propionale
2. 1000 ppm of IRGAFOS™ 168 (phosphite: tris-(2,4 di-tert-butyl phenyl) phosphite)
3. 1000 ppm of CYASSORB™ 3529 (HALS: CAS Registry number 193098-40-7)

PE-3 has a very low flow rate (the I$_2$ test does not produce a meaningful result; the flow rate with the 21.6 kg load is 4.5 grams per 10 minutes). It is prepared with a chromium based catalyst. Polyethylene having this flow rate is not typically used in rotomolding processes (instead, this type of polyethylene is suitable for blow molding). PE-3 does not contain any stabilizers additives—it is unstabilized.

PE-4 has a comparatively low flow rate (an I$_2$ of less than 1 grams/10 minutes and an I$_{21}$ of 64 grams per 10 minutes). However, the flow rate of PE-4 is too high to be suitable as the substantially non-stabilized polyethylene of the present disclosure. It is prepared with a Z/N catalyst. Polyethylene of this type is suitable for the preparation of film. PE-4 contains 300 ppm of a hindered phenol (IRGANOX™ 1010; CAS Registry number 6683-19-8) as the only stabilizer.

TABLE 2

(Blend) Compositions and Rotomolding Conditions

| Experiment Number | Composition | Cook Time (minutes) | Oven Temperature (° C.) |
|---|---|---|---|
| 1 - C | PE-1 100% | 18 | 295 |
| 2 | 90% PE-1 + 10% PE-3 | 18 | 295 |
| 3 - C | 90% PE-1 + 10% PE-4 | 18 | 295 |
| 4 - C | PE-2 100% | 22 | 295 |
| 5 | 90% PE-2 + 10% PE-3 | 22 | 295 |
| 6 - C | 90% PE-2 + 10% PE-4 | 22 | 295 |
| 7 - C | PE-1 100% | 23 | 295 |
| 8 | 90% PE-1 + 10% PE-3 | 23 | 295 |
| 9 - C | 90% PE-1 + 10% PE-4 | 23 | 295 |
| 10 | 90% PE-2 + 10% PE-3 | 26 | 295 |
| 11 - C | 90% PE-2 + 10% PE-4 | 26 | 295 |
| 12 | 95% PE-1 + 5% PE-3 | 23 | 295 |
| 13 - C | 95% PE-1 + 5% PE-4 | 23 | 295 |
| 14 - C | PE-2 100% | 26 | 295 |
| 15 | 95% PE-2 + 5% PE-3 | 26 | 295 |
| 16 - C | 95% PE-2 + 5% PE-4 | 26 | 295 |

C = comparative

TABLE 3

Surface Roughness Results

| Experiment Number | Composition | Inside Surface Roughness Average microns | Outside Surface Roughness Average microns |
|---|---|---|---|
| 1 - C | PE-1 100% | 6.6 | 2.7 |
| 2 | 90% PE-1 + 10% PE-3 | 29.0 | 4.4 |
| 3 - C | 90% PE-1 + 10% PE-4 | 9.0 | 2.4 |
| 4 - C | PE-2 100% | 6.0 | 5.8 |
| 5 | 90% PE-2 + 10% PE-3 | 16.0 | 5.5 |
| 6 - C | 90% PE-2 + 10% PE-4 | 9.5 | 2.0 |
| 7 - C | PE-1 100% | 4.4 | 4.2 |
| 8 | 90% PE-1 + 10% PE-3 | 17.4 | 2.5 |
| 9 - C | 90% PE-1 + 10% PE-4 | 10.5 | 3.7 |
| 10 | 90% PE-2 + 10% PE-3 | 22.4 | 2.3 |
| 11 - C | 90% PE-2 + 10% PE-4 | 12.4 | 3.0 |
| 12 | 95% PE-1 + 5% PE-3 | 17.8 | 2.4 |
| 13 - C | 95% PE-1 + 5% PE-4 | 4.4 | 2.8 |
| 14 - C | PE-2 100% | 7.1 | 2.5 |
| 15 | 95% PE-2 + 5% PE-3 | 22.9 | 2.8 |
| 16 - C | 95% PE-2 + 5% PE-4 | 11.6 | 3.2 |

Rotomolded parts were prepared from the compositions shown in Table 2 in a rotational molding machine sold under the tradename Rotospeed RS3-160 by Ferry Industries Inc. The machine has two arms which rotate about a central axis. Each arm is fitted with a plate which rotates on an axis that is roughly perpendicular to the axis of rotation of the arm. Each plate is fitted with three cast aluminum molds that produce plastic cubes having dimensions of 12.5 inches (31.8 cm)×12.5 inches×12.5 inches. These molds produce parts having a nominal thickness of about 0.25 inches (0.64 cm) when initially filled with a standard charge of about 3.7 kg of polyethylene resin.

A gas fired furnace which is capable of providing 2 million British thermal units (Btu) per hour is used to provide hot air that is circulated about the molds by a fan.

In general, the temperature within the enclosed oven is maintained at a temperature of between 250° C. and 400° C. for specified periods of time while the machine rotates the arms (typically, at about 8 revolutions per minute (rpm) and the plate (typically, at about 2 rpm). Specific molding conditions for the different compositions are reported in Table 2.

The "cooked parts" are then cooled by opening the oven. Water spray may also be used to facilitate cooling. "Cook times", rotation speed, temperatures and cooling cycles are computer controlled with appropriate software which also includes a data acquisition system.

Surface Roughness

The parts were cut to provide test specimens. Surface roughness data for the interior and exterior surfaces are shown in Table 3.

Adhesion Test

Test specimens were prepared by applying a layer of polyurethane foam having a thickness of 1 inch (2.5 cm) between two pieces of rotomolded polyethylene (prepared in the manner described above).

The foam was allowed to "condition" at 23° C. for 24 hours before conducting the adhesion test.

The test specimens were installed in a tensile test machine (sold under the trademark Instron 4204) with the grips being attached to the two polyethylene layers. The test speed was set at 8 inches per minute. The test continued until the part failed. The results are reported as "peel strength" (units of pounds force) in Table 4.

TABLE 4

Adhesion Test Results

| Experiment | Average Peel Strength (lbf) | Standard Deviation (lbf) |
| --- | --- | --- |
| 1 | 20.4 | 5.0 |
| 2 | 48.3 | 5.5 |
| 3 | 25.8 | 5.9 |
| 4 | 21.0 | 1.6 |
| 5 | 36.3 | 10.1 |
| 7 | 0 | — |
| 12 | 70.6 | 12.5 |
| 13 | 16.8 | 2.3 |

The results show that a rotomolded part that is prepared with a conventional polyethylene composition and having a conventional stabilizer package produces a molded part that does not adhere well to polyurethane foam when the part is prepared according to the rotomolding conditions of the examples (see comparative experiments 1, 4, and 7).

The use of a substantially non-stabilized polyethylene having a low flow rate and a large particle size (i.e. PE-3) was observed to improve/increase surface roughness on the inside of the molded part (inventive experiments 2, 5, 8, 12 and 15 in Table 3).

Comparative experiments 3-C, 6-C, 9-C, 11-C, 13-C and 16-C (using PE-4 as the minor component) indicate that the use of a polyethylene having a comparatively higher flow rate is less effective for producing a rough interior surface.

Adhesion data in Table 4 show that higher surface roughness can improve adhesion to polyurethane.

Finally, while not wishing to be bound by theory, it is postulated that there may be an optimum cooking time/temperature condition that maximizes the adhesive bond because higher temperatures and or longer cooking times may increase the level of oxidation of the polyethylene to a higher degree.

The present technology may "broaden" the molding conditions that provide suitable adhesive strength because—as shown by the data in Table 4—we have observed that higher surface roughness can be corrected with stronger adhesion.

We have observed that the interior surface of rotomolded parts prepared according to this process can have carbonyl (C=O) groups that are detectable by Fourier Transform Infra Red (FTIR) analysis.

We have also observed that the use of a substantially non-stabilized polyethylene having a low flow rate and large particle size can produce a rotomolded part having a high surface roughness.

We have observed that polyurethane adheres well to the rough surface having carbonyl groups.

Thus, while not wishing to be bound by theory, it is believed that:
1) the stabilized polyethylene (which has a small particle size and high flow rate in comparison to the substantially non-stabilized polyethylene) melts in the heated mold and preferentially flows to the mold surface, thereby forming the exterior surface of the molded part);
2) the substantially non-stabilized polyethylene (having large particle size and poor flow rate) does not flow to the mold surface as well as the stabilized polyethylene, with the result that the substantially non-stabilized polyethylene is present on the interior surface of the molded part;
3) the large particles of the substantially non-stabilized polyethylene, together with the poor flow rate of this material, contribute to the high surface roughness of the interior surface of parts prepared according to the present process;
4) the substantially non-stabilized polyethylene is partially oxidized during the rotomolding process, thereby leading to the formation of oxidized species on the interior surface of the part—in particular, carbonyl groups (C=O) are formed in sufficient quantity to be observed by FTIR analysis; and
5) the combination of A) high surface roughness and B) the presence of carbonyls improves adhesion between the surface of the rotomolded part and polyurethane.

INDUSTRIAL APPLICABILITY

Provided is a rotomolding composition comprising a blend of two polyethylenes: 1) a well stabilized polyethylene; and 2) a poorly stabilized polyethylene having a very low flow rate. Rotomolded parts prepared from the composition have a rough inner surface and polyurethane foam adheres well to this rough surface.

The invention claimed is:
1. A polyethylene composition comprising:
1) From 85 to 99 weight % of a stabilized polyethylene having a melt index, $I_2$, as measured by ASTM D 1238 at 190° C. using a 2.16 kg lead, of from 0.5 to 10 grams/10 minutes; a density as measured by ASTM D792 of from 0.920 to 0.950 g/cc; and
2) From 15 to 1 weight % of a substantially non-stabilized polyethylene having (i) a high load melt index, $I_{21}$, as measured by ASTM D1238 at 190° C. using a 21.6 kg load, of from 2 to 20 grams/10 minutes; (ii) a density of from 0.950 to 0.965 g/cc as measured by ASTM D792; and (iii) an average particle size of from 500 to 3000 microns;
wherein:

the stabilized polyethylene contains a stabilizer package comprising a primary antioxidant and a secondary antioxidant;

the substantially non-stabilized polyethylene contains less than 100 ppm of primary antioxidant and/or secondary antioxidant; and an average particle size of said stabilized polyethylene is smaller than the average particle size of said substantially non-stabilized polyethylene.

2. The polyethylene composition of claim 1 wherein said average particle size of the substantially non-stabilized polyethylene is from 500 to 1000 microns.

3. The polyethylene composition of claim 1 wherein said substantially non-stabilized polyethylene has a high load melt index, $I_{21}$, as measured by ASTM D1238 at 190° C. using a 21.6 kg load, of form 3 to 6 grams per 10 minutes.

4. The polyethylene composition of claim 1 wherein said stabilized polyethylene contains a stabilizer package comprising:

1.1) the primary antioxidant in an amount of from 250 to 1500 parts per million by weight, and 1.2) the secondary antioxidant in an amount of from 250 to 1500 parts per million by weight.

5. A process to prepare a rotomolded part comprising:

a) preparing a polymer composition according to claim 1; and b) subjecting said blend to rotational molding.

6. The process of claim 5 wherein said rotational molding is undertaken at a temperature of from 250° C. to 400° C.

7. The process of claim 5 wherein the rotomolded part has an interior surface with a surface roughness of from 10 microns to 30 microns.

8. The process of claim 7 wherein said surface roughness is from 12 to 20 microns.

9. The process of claim 7 wherein said interior surface is further characterized by having carbonyl functional groups that are detectable by a Fourier Transform Infra Red instrument.

\* \* \* \* \*